US008903981B2

(12) United States Patent
Alimi et al.

(10) Patent No.: US 8,903,981 B2
(45) Date of Patent: Dec. 2, 2014

(54) METHOD AND SYSTEM FOR ACHIEVING BETTER EFFICIENCY IN A CLIENT GRID USING NODE RESOURCE USAGE AND TRACKING

(75) Inventors: Richard A. Alimi, Simsbury, CT (US); William Sweeney, Norwalk, CT (US); Nianjun Zhou, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1602 days.

(21) Appl. No.: 12/115,257

(22) Filed: May 5, 2008

(65) Prior Publication Data
US 2009/0276519 A1 Nov. 5, 2009

(51) Int. Cl.
*G06F 15/173* (2006.01)
*G06F 9/50* (2006.01)
*G06F 9/46* (2006.01)
*G06F 11/00* (2006.01)

(52) U.S. Cl.
CPC .................................. *G06F 9/5072* (2013.01)
USPC .............. 709/224; 709/226; 718/104; 714/42

(58) Field of Classification Search
None
See application file for complete search history.

(56) References Cited

U.S. PATENT DOCUMENTS

| 5,815,793 | A | 9/1998 | Ferguson | |
|---|---|---|---|---|
| 6,871,223 | B2 | 3/2005 | Drees | |
| 7,058,949 | B1 * | 6/2006 | Willen et al. | 718/104 |
| 7,171,554 | B2 | 1/2007 | Sahlbach | |
| 7,548,977 | B2 * | 6/2009 | Agapi et al. | 709/226 |
| 2002/0152305 | A1 * | 10/2002 | Jackson et al. | 709/224 |
| 2004/0153545 | A1 * | 8/2004 | Pandya et al. | 709/226 |
| 2006/0075079 | A1 * | 4/2006 | Powers et al. | 709/220 |
| 2006/0168163 | A1 | 7/2006 | Fortman et al. | |
| 2007/0011683 | A1 * | 1/2007 | Helander | 718/104 |
| 2008/0059554 | A1 * | 3/2008 | Dawson et al. | 709/201 |

\* cited by examiner

*Primary Examiner* — Wen-Tai Lin
(74) *Attorney, Agent, or Firm* — Cahn & Samuels, LLP

(57) ABSTRACT

A system, method and computer program product for distributing task assignments on a computer network comprising a client grid having at least one server coupled to at least one client node and a plurality of client computers coupled to the client node through a plurality of monitoring agents. Each monitoring agent collects data regarding the resources a particular client computer makes available to the grid and transmits the data to the grid server when the client computer requests a grid task. The system generates a resource probability distribution based on the historical computing resource data and employs a scheduling algorithm to distribute grid tasks to the client computers using at least the probability distribution.

9 Claims, 4 Drawing Sheets

METHOD AND SYSTEM FOR ACHIEVING BETTER EFFICIENCY IN A CLIENT GRID USING NODE RESOURCE USAGE AND TRACKING

I. FIELD OF THE INVENTION

This invention relates in general to the field of computer systems and efficient task distribution and in particular to the field of using client node resource usage and tracking information to improve the efficiency of task distribution in a client grid environment.

II. DESCRIPTION OF THE PRIOR ART

Grid computing refers generally to a network including tools and protocols for coordinated resource sharing and problem solving among pooled resources. These pooled assets can be connected to a local network or distributed across the globe. FIG. 1 illustrates a traditional computing grid 100, having a plurality of client computers (120, 122, 124, 126) coupled to a common grid server (110). Each client computer may be located in a remote location from the grid server (110) and from each other. The client machines make themselves available to the server for grid tasks based on their current workload. Client computer D (126) is depicted as not being available to accept grid tasking from the grid server.

Traditionally, grid environments allow large computational tasks to be distributed among the computers attached to the grid and thus completed much faster than if they were executed by a single computer. Current grid environments such as "BOINC," the Berkley Open Infrastructure for Network Computing, and United Devices's "Grid MP" product implement this functionality. Tasks are generally assigned to client machines on the grid by the grid server. In general grid servers employ a "brute force" method of tasking, where identical tasks are assigned to several client machines on a grid to ensure that the result is accurate and completed in a timely fashion.

Other grid packages, such as Inferno Grid Software and Entropia also appear to employ "brute force" or repetitive tasking. Sun's Grid Engine, employs a module that will track whether a client has not been used interactively for some time, and will use that unused machine for grid task if it has not. This considers a simple binary test, Idle/Not Idle.

Referring now to FIG. 2 which illustrates traditional "brute force" grid tasking. Client machines (120, 122, 124, 126, 128 and 129) are available to grid server 110 for tasking. The grid server receives a task for completion (Task A) and will distribute it (Task A) to the 6 client machines on the network. This duplicative tasking ensures that the server receives results for the task in a timely manner, as the task assignments from the grid server are considered low priority jobs for the client machines, and the client machines' current workload and available CPU resources is unknown to the grid server. A second task (Task B) received by the grid server 110 thus must wait for resources from the grid to become available before the task can be executed by the client machines on the grid.

Grid efficiency is greatly diminished by this excessive duplicative tasking, since computing resources that could be more effectively employed to perform other grid tasks are often assigned a task that is easily handled by fewer of the grid's computing resources. Grid efficiency is also diminished by duplicative tasking when a grid server uses its computing resources to assign a task to a client computer that is incapable of finishing the assigned task in the near future. Time and resources are wasted in continued attempts to assign a task to a client computer whose resources are currently being used for tasks unrelated to the grid.

Current grid environments do not track historic information about each client computer; generally they only track enough information to determine whether or not a client machine is available for task assignments from the grid and their raw capabilities, such as total memory or CPU speed.

III. SUMMARY OF THE INVENTION

If a grid environment were able to track CPU resource information (e.g., client machine CPU resource availability, availability as a function of time, duration and time of day, memory resources available, etc.) about each client machine, the grid would be able to distribute tasks to machines that have the necessary resources to efficiently complete a task. This allows a grid to distribute task with great confidence of receiving a result in a timely manner reducing the need for duplicative tasking.

Disclosed is a system for distributing task assignments on a computer network comprising a client grid having at least one server coupled to at least one client node and a plurality of client computers coupled to the client node through a plurality of monitoring agents. Each monitoring agent collects data regarding the resources a particular client computer makes available to the grid and transmits the data to the grid server when the client computer requests a grid task.

Also disclosed is a method of efficiently distributing task assignments from a server to client computers on a computer grid comprising of monitoring the resource availability of a plurality of client computers coupled to a grid and collecting historical computing resource availability data for a plurality of client computers coupled to the grid. The method includes transmitting resource availability data from said plurality of client computers to a grid server.

The method also includes generating a resource probability distribution based on the historical computing resource data and employing a scheduling algorithm to distribute grid tasks to the client computers using at least the probability distribution.

Also disclosed is a computer program product comprising a computer-usable medium having a computer-usable program code for efficiently distributing task assignments from a server to client computers on a computer grid. The computer program product employs computer-usable program code for monitoring the resource availability of a plurality of client computers coupled to a grid. The computer program product also employs computer-usable program code for collecting historical computing resource availability data for a plurality of client computers coupled to the grid. The computer program product also features computer-usable program code for generating a resource probability distribution based on the historical computing resource data and computer-usable program code employing a scheduling algorithm to distribute grid tasks to the client computers using at least the resource probability distribution.

IV. BRIEF DESCRIPTION OF THE DRAWINGS

In order to describe the manner in which the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings.

V. DETAILED DESCRIPTION

Various embodiments are discussed in detail below. While specific implementations of the disclosed technology are discussed, it should be understood that this is done for illustration purposes only. A person skilled in the relevant art will recognize that other components and configurations may be used without departing from the spirit and scope of the invention.

The disclosure relates to a system, method and computer program product for efficiently distributing task assignments to a plurality of client computers coupled to at least one server forming a client grid. The system employs a monitoring agent that resides on each client computer coupled to the grid to monitor that particular client computer's resource availability and transmit relevant data to the grid server. The server uses this data to optimize the tasking to that particular client computer.

Figure 3:
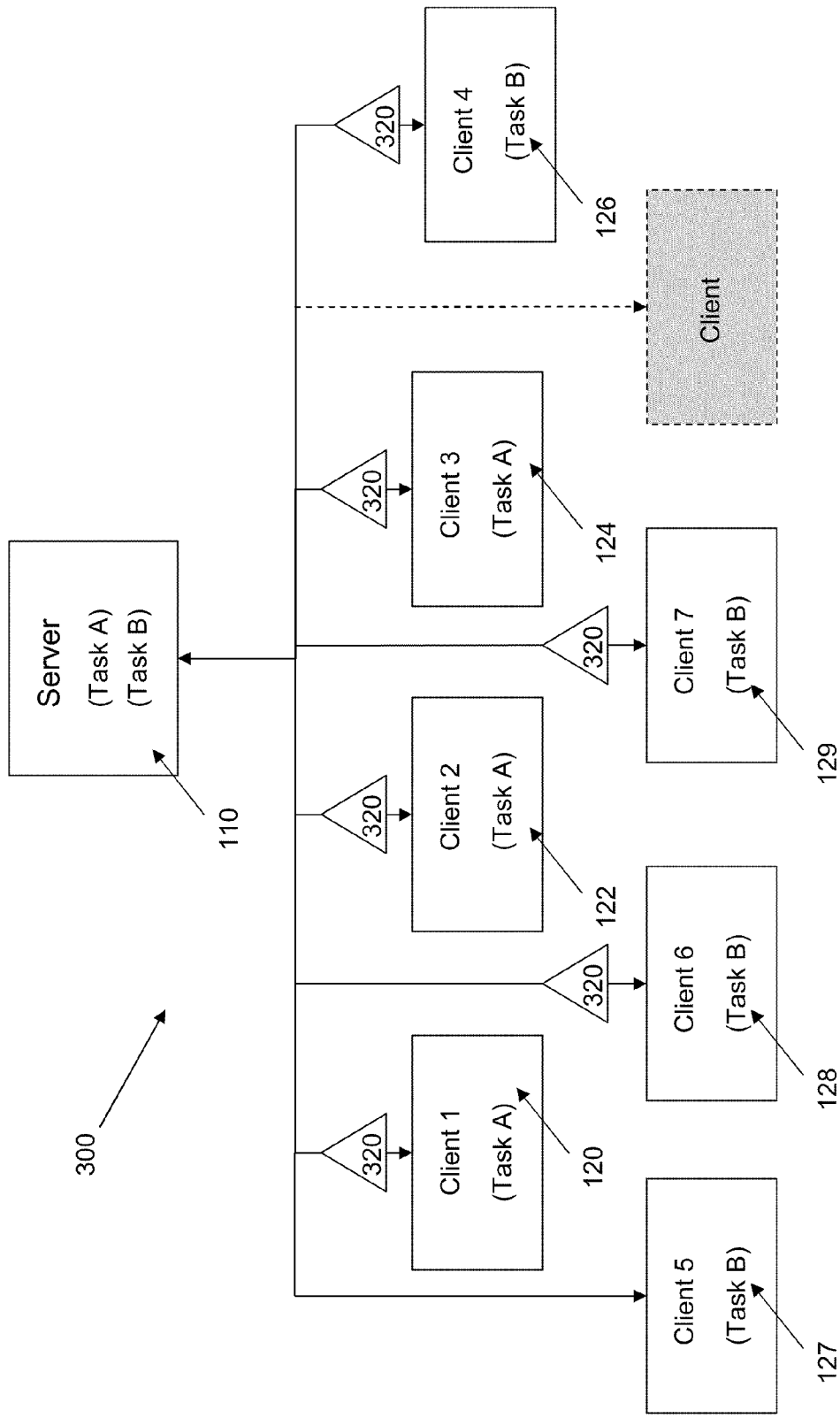
FIG. 3 illustrates a block diagram of an example embodiment of a system for efficiently distributing task assignments on a client grid featuring a plurality of client computer coupled to a grid server via a plurality of monitoring agents.

Referring now to the figures, wherein like reference numbers denote like components, elements, or features, FIG. 3 illustrates a block diagram of an example embodiment of a system for efficiently distributing task assignments on a client grid (300) featuring a plurality of client computers (120, 122, 124, 126, 127, 128, 129) coupled to a grid server (110) via a plurality of monitoring agents (320).

The system features a client grid having at least one server (110) coupled to at least one client node and a plurality of client computers coupled to the client node through a plurality of monitoring agents (320). Each monitoring agent (320) collects data regarding the computing resources a particular client computer (120, 122, 124, 126, 127, 128, 129) makes available to the grid (300) and transmits this data to the grid server (110) when the client computer requests a grid task.

The monitoring agent (320) preferably resides on each client computer coupled to the grid. The agent collects the idle resources of the client computer or client node. In one embodiment the collected results are returned to the grid server or grid management center when the client next contacts the management center for a task assignment to reduce the communication overhead of this system, however the monitoring agent may send information to the management center at a predetermined interval or other predetermined event.

Figure 4:
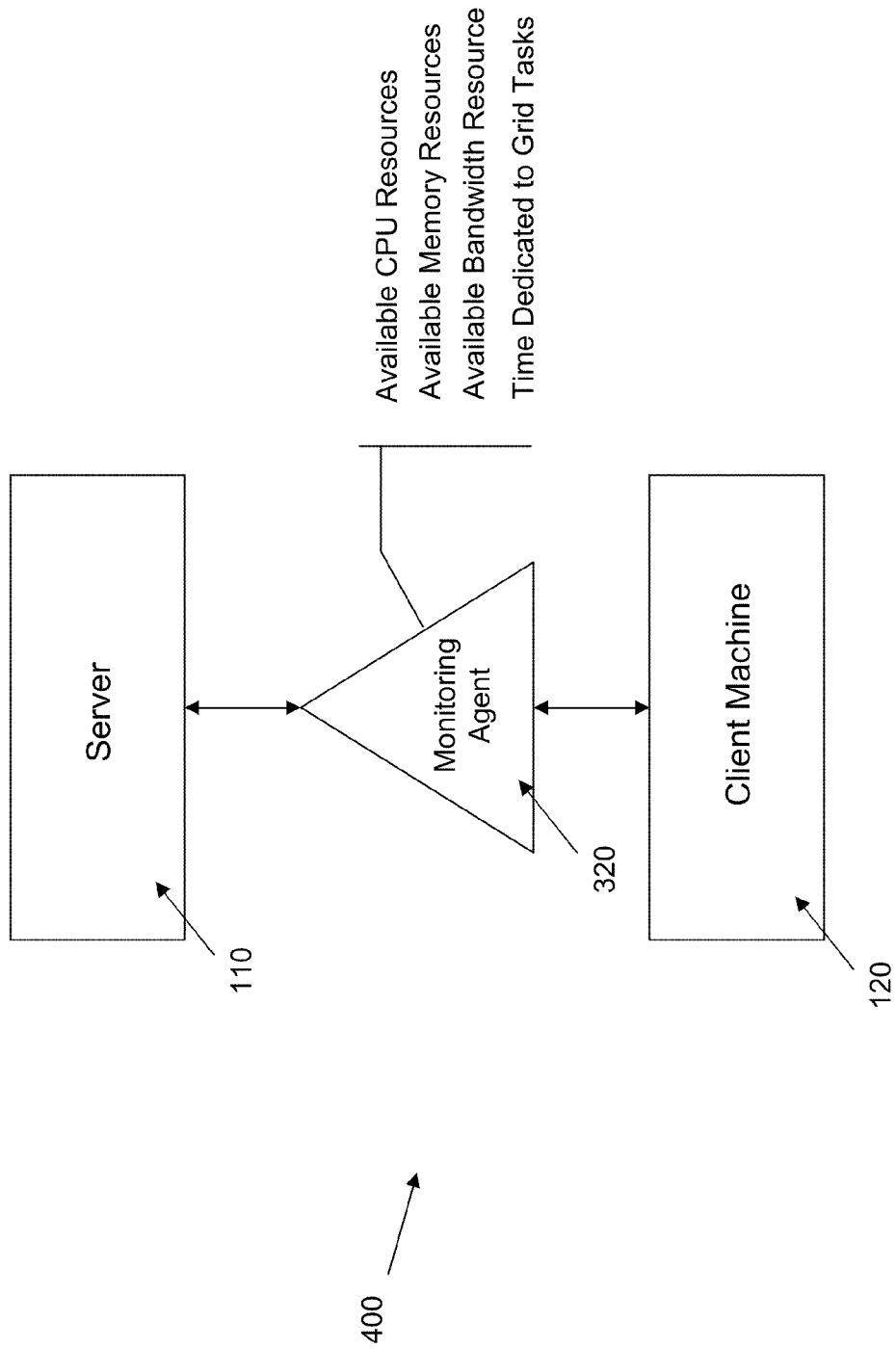
FIG. 4 illustrates a block diagram of an example embodiment of a client node featuring a server coupled to a client machine through a monitoring agent.

Referring now to FIG. 4 with continued reference to FIG. 3, FIG. 4 illustrates a block diagram of an example embodiment of a client node featuring a grid server (110) coupled to a client computer (120) through monitoring agent (320).

The monitoring agent (320) collects data relating to the host client computer's computing resources available to the grid. This computing resource data may relate to the host client computer's CPU availability to the grid, the memory availability, available network bandwidth, the amount of time the client computer's CPU dedicates to grid tasks, how much the grid uses a particular resource, the time interval that the resource is available to the grid, how long is it idle, or general data regarding when and how much of the resource is available.

The grid server receives the transmitted historical computing resource availability data for a plurality of client computers coupled to the grid and uses the data to generate a resource probability distribution based on the historical computing resource data. The system then employs a scheduling algorithm to distribute grid tasks to said plurality of client computers based on the distribution of the historical data.

With continued reference to FIG. 3, the system is able to anticipate the resources available to the grid and make tasking decisions based on this knowledge. This allows the grid to employ a scheduling algorithm that optimizes the task scheduling based on the anticipated resources.

Figure 1:
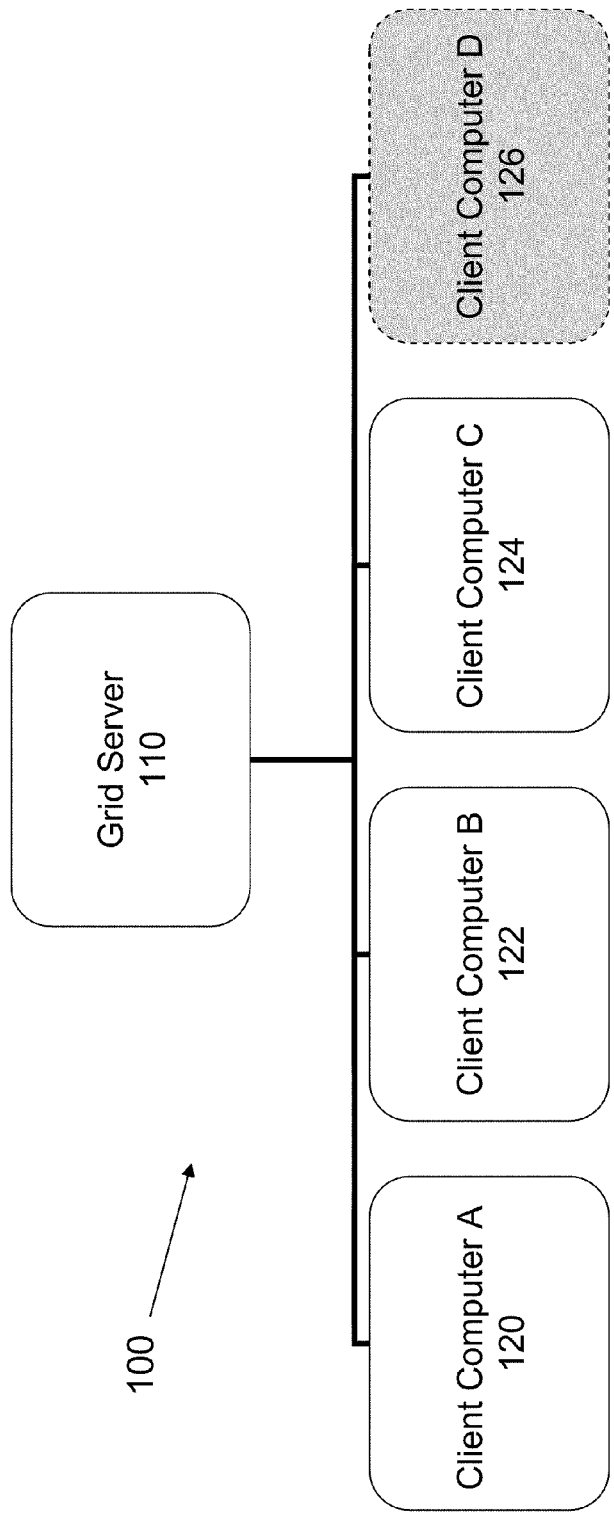
FIG. 1 illustrates a block diagram of an exemplary grid network structure featuring multiple client computer coupled to a grid server.
Figure 2:
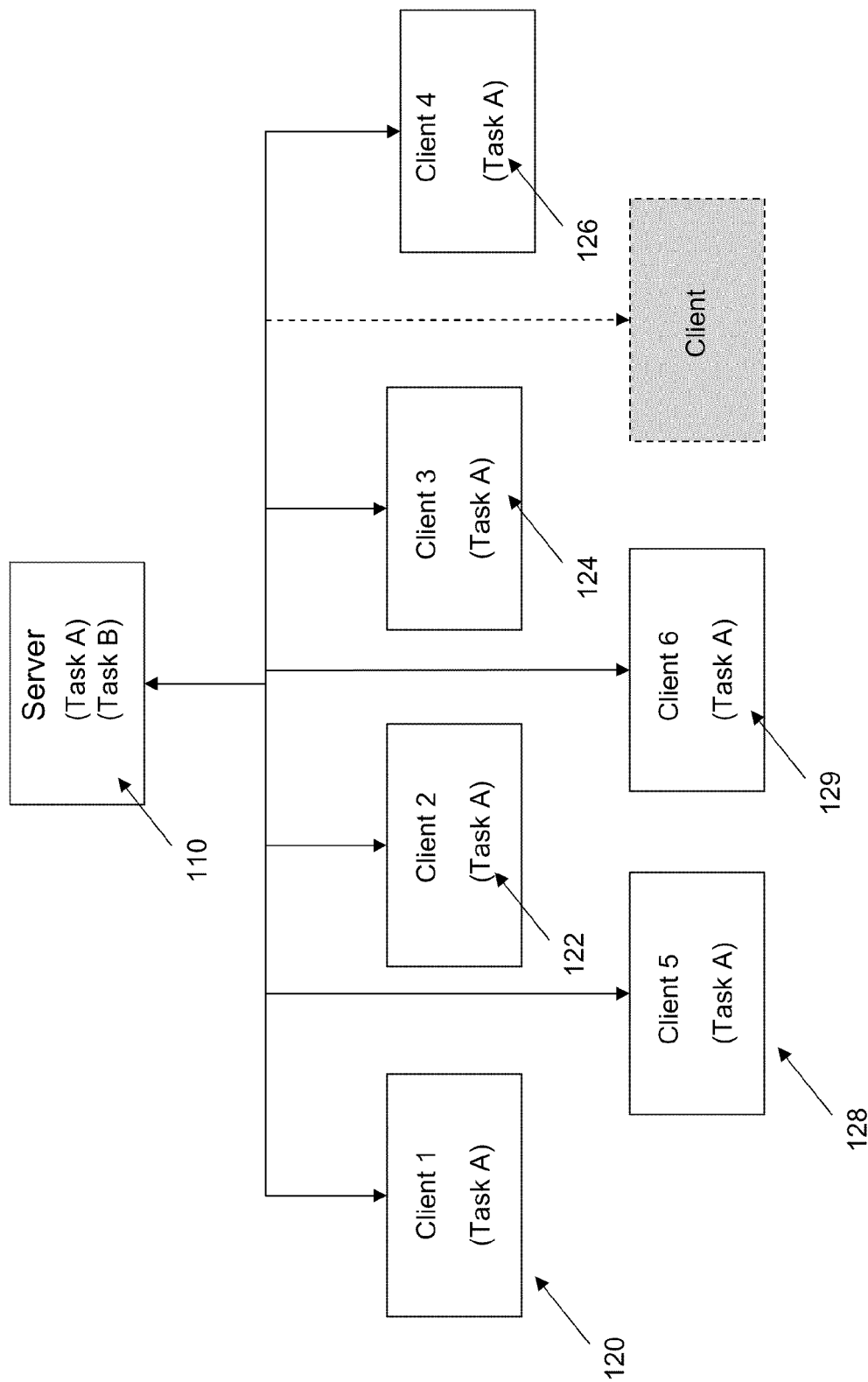
FIG. 2 illustrates a block diagram depicting the traditional "brute force" approach to grid tasking.

Referring again to FIG. 1, in traditional grid tasking, the sever employs what is knows as a "brute force" method of grid computing. A single task must be assigned to a large quantity of computers, since the grid does not know how much unused capacity is present and available to the grid in each client computer thereon. For example, if the grid has two tasks to complete, Task A and Task B, without any knowledge regarding resource availability a traditional grid would likely make duplicative task assignments, assigning each of the computers on the grid Task A to ensure it receives a useful result in a timely manner. Even if the grid has 95% of each client computer's CPU resources for the time required to complete the task which only requires 3 of the 6 computers, the duplicative assignments would continue because the grid has no way of making this determination. Task B would have to wait until each computer on the grid returns a result for Task A before Task B can be assigned to that computer.

However, if the grid could anticipate client computer resource availability, the grid could optimize the tasking and assign Task A to the necessary number or client resources and simultaneously assign Task B to the necessary number of computing resources to return a useful result. FIG. 3 shows a representation how a grid benefits from being able to anticipate resource availability and optimize tasking in view thereof. Rather than assign Task A to every machine, the server uses only the computer resources necessary, while the other resources can be assigned another task.

Another embodiment of the present invention is a method of efficiently distributing task assignments from a server to client computers on a computer grid comprising monitoring the resource availability of a plurality of client computers coupled to a grid and collecting historical computing resource availability data for a plurality of client computers coupled to the grid. The method includes transmitting resource availability data from said plurality of client computers to a grid server.

The method also includes generating a resource probability distribution based on the historical computing resource data and employing a scheduling algorithm to distribute grid tasks to the client computers using at least the probability distribution.

In another embodiment the method features at least one monitoring agent, said at least monitoring agent residing on at least one client computer coupled to the grid and monitoring the computing resources that said at least one client computer makes availability to said grid.

In yet another embodiment at least one monitoring agent resides on each client computer coupled to the said grid, monitoring the computing resources that each of said at least one client computer makes available to said grid.

In yet another embodiment of the invention resides in a computer program product comprising computer-usable medium having a computer-usable program code for efficiently distributing task assignments from a server to client computers on a computer grid the computer program product having computer-usable program code for monitoring the resource availability of a plurality of client computers coupled to a grid. The computer program product includes transmitting resource availability data from said plurality of client computers to a grid server.

The computer program product also employs computer-usable program code for collecting historical computing resource availability data for a plurality of client computers coupled to the grid and computer-usable program code for generating a resource probability distribution based on the historical computing resource data and computer-usable program code employing a scheduling algorithm to distribute grid tasks to the client computers using at least the probability distribution.

The disclosed invention can take the form of an entirely hardware embodiment, an entirely software embodiment or an embodiment containing both hardware and software elements. In at least one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory, (CD-ROM), compact disk-read/write (CD-R/W) and DVD.

A data processing system suitable for storing and/or executing program code will include at least one processor coupled directly or indirectly to memory elements through a system bus. The memory elements can include a local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It will be understood that each block of the flowchart illustrations and block diagrams and combinations of those blocks can be implemented by computer program instructions and/or means.

Although specific example embodiments have been illustrated and described herein, those of ordinary skill in the art appreciate that other variations, aspects, or embodiments may be contemplated, and/or practiced without departing from the scope or the spirit of the appended claims.

The invention claimed is:

1. A system for distributing task assignments on a computer network comprising:
 a client grid having at least one server coupled to at least one client node,
 a plurality of client computers coupled to said client node through a plurality of monitoring agents;
 wherein each said monitoring agent collects data regarding the available resources of a particular client computer and periodically transmits said data to a grid server and said grid server anticipates the available resources of each client computer coupled to said client node based on previously received data regarding the available resources of each client computer and distributes grid tasks to each client computer of the grid based on said previously received data regarding the available resources.

2. The system of claim 1 wherein said monitoring agent resides on said client computer.

3. The system of claim 2 wherein said monitoring agent collects data relating to the host client computer's computing resources available to the grid.

4. The system of claim 3 wherein said host client computer's computing resources available to the grid includes the client computer's CPU availability.

5. The system of claim 3 wherein said host client computer's computing resources available to the grid includes the client computer's memory availability.

6. The system of claim 3 wherein said host client computer's computing resources available to the grid includes the amount of available network bandwidth.

7. The system of claim 3 wherein said host client computer's computing resources available to the grid includes the amount of time dedicated to grid tasks.

8. The system of claim 3 wherein said data relating to the host client computer's computing resources available to the grid includes computer resource usage data.

9. The system of claim 1 wherein said monitoring agent transmits said data regarding the available resources of a particular client computer at predetermined intervals.

* * * * *